US009066170B2

(12) United States Patent
Forutanpour et al.

(10) Patent No.: US 9,066,170 B2
(45) **Date of Patent: *Jun. 23, 2015**

(54) VARIABLE BEAMFORMING WITH A MOBILE PLATFORM

(71) Applicant: QUALCOMM Incorporated, San Diego, CA (US)

(72) Inventors: Babak Forutanpour, Carlsbad, CA (US); Andre Gustavo P. Schevciw, San Diego, CA (US); Erik Visser, San Diego, CA (US); Brian Momeyer, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/954,536

(22) Filed: Jul. 30, 2013

(65) Prior Publication Data

US 2013/0316691 A1 Nov. 28, 2013

Related U.S. Application Data

(63) Continuation of application No. 13/006,303, filed on Jan. 13, 2011, now Pat. No. 8,525,868.

(51) Int. Cl.
*H04N 7/15* (2006.01)
*H04R 3/00* (2006.01)

(52) U.S. Cl.
CPC ............ *H04R 3/005* (2013.01); *H04R 2201/40* (2013.01); *H04R 2410/01* (2013.01); *H04R 2430/25* (2013.01); *H04R 2499/11* (2013.01); *H04R 2499/15* (2013.01)

(58) Field of Classification Search
CPC ............... H04R 3/005; H04R 2201/40; H04R 2499/15; H04R 2430/25; H04R 2499/11; H04R 2410/01; H04N 7/14; H04N 7/141; H04N 7/147
USPC ................ 348/14.01-14.16; 455/418; 381/92
See application file for complete search history.

(56) References Cited

U.S. PATENT DOCUMENTS 5,715,318 A 2/1998 Hill et al.
2002/0149672 A1 10/2002 Clapp et al.
(Continued)

FOREIGN PATENT DOCUMENTS

JP 2006222618 A 8/2006
JP 2008205957 A 9/2008
(Continued)

OTHER PUBLICATIONS

International Search Report and Written Opinion—PCT/US2012/021340—ISAEPO—May 4, 2012.
(Continued)

*Primary Examiner* — Melur Ramakrishnaiah
(74) *Attorney, Agent, or Firm* — Jen Pascua; Michael R. Johnson

(57) ABSTRACT

A mobile platform includes a microphone array and is capable of implementing beamforming to amplify or suppress audio information from a sound source. The sound source is indicated through a user input, such as pointing the mobile platform in the direction of the sound source or through a touch screen display interface. The mobile platform further includes orientation sensors capable of detecting movement of the mobile platform. When the mobile platform moves with respect to the sound source, the beamforming is adjusted based on the data from the orientation sensors so that beamforming is continuously implemented in the direction of the sound source. The audio information from the sound source may be included or suppressed from a telephone or video-telephony conversation. Images or video from a camera may be likewise controlled based on the data from the orientation sensors.

22 Claims, 5 Drawing Sheets

(56) References Cited

U.S. PATENT DOCUMENTS

| | | | | |
|---|---|---|---|---|
| 2006/0269278 | A1* | 11/2006 | Kenoyer et al. | 396/428 |
| 2006/0271370 | A1 | 11/2006 | Li | |
| 2007/0025562 | A1 | 2/2007 | Zalewski et al. | |
| 2008/0101624 | A1 | 5/2008 | Schentrup et al. | |
| 2008/0199025 | A1 | 8/2008 | Amada | |
| 2008/0259731 | A1* | 10/2008 | Happonen | 367/121 |
| 2008/0297589 | A1 | 12/2008 | Kurtz et al. | |
| 2009/0099836 | A1* | 4/2009 | Jacobsen et al. | 704/3 |
| 2010/0046779 | A1 | 2/2010 | Crawford et al. | |
| 2010/0123785 | A1 | 5/2010 | Chen et al. | |
| 2010/0128892 | A1* | 5/2010 | Chen et al. | 381/92 |
| 2010/0323652 | A1 | 12/2010 | Visser et al. | |
| 2011/0038489 | A1 | 2/2011 | Visser et al. | |
| 2011/0158418 | A1 | 6/2011 | Bai et al. | |
| 2012/0182429 | A1 | 7/2012 | Forutanpour et al. | |
| 2012/0284619 | A1* | 11/2012 | Myllyla et al. | 715/716 |
| 2013/0177168 | A1* | 7/2013 | Inha et al. | 381/92 |

FOREIGN PATENT DOCUMENTS

| | | | |
|---|---|---|---|
| JP | 2008278433 | A | 11/2008 |
| JP | 2009296232 | A | 12/2009 |

OTHER PUBLICATIONS

Wang, H. et al., “Voice Source Localization for Automatic Camera Pointing System in Videoconferencing”, Acoustics, Speech, and Signal Processing, 1997. ICASSP-97, Apr. 1997, pp. 187-190, vol. 1.

* cited by examiner

VARIABLE BEAMFORMING WITH A MOBILE PLATFORM

CROSS-REFERENCE TO RELATED APPLICATION(S)

This application is a continuation of U.S. Ser. No. 13/006,303, entitled "Variable Beamforming with a Mobile Platform," filed Jan. 13, 2011, which is assigned to the assignee hereof and which is incorporated herein by reference.

BACKGROUND

Current computers, such as laptops, desktop computers, as well as smart phones and tablet computers, do not have the capability to easily include persons other than the primary user on a call if the others are located in different positions in the room, even if the device includes directional microphones or microphone arrays. Simple amplification of all sound sources in a room typically produces a large amount of undesirable background noise. Individuals, who wish to participate in a telephone or video-telephony call, are typically required to physically move and sit near the microphone or in front of the camera. Consequently, persons who may be seated or comfortably resting, but wish to say a few words on a call are either obligated to move closer to the microphone and/or camera or will not be clearly heard or seen.

While beamforming techniques using microphone arrays are known, such as high noise-suppression techniques, and are able to reduce distracting ambient noise and bit rate requirements during voice calls, Voice over Internet Protocol (VOIP) or otherwise, these techniques rely generally on beam steering algorithms which attempt to identify a single talker based on several temporal-, spatial-, frequency-, and amplitude-based cues, which cause attenuation during fast switches between talkers and prevent multiple talker scenarios such as the one described. Additionally, under poor signal to noise ratio (SNR) conditions, the direction of arrival identification task becomes difficult causing voice muffling, background noise modulation and other artifacts. Moreover, with devices that are mobile, such as a computer tablet or smart phone, the device is likely to be moved during the conversation rendering the direction of arrival identification task even more difficult.

It would therefore be beneficial to develop a system whereby a user can easily include others who are in the room in the telephone or video telephony conversation (or other such applications) with minimal effort.

SUMMARY

A mobile platform includes a microphone array and implements beamforming to amplify or suppress audio information from the direction of a sound source. The mobile platform further includes orientation sensors that are used to detect movement of the mobile platform, which is used to adjust the beamforming to continue to amplify or suppress audio information from the direction of a sound source while the mobile platform moves with respect to the sound source. The direction of the sound source can be provided through a user input. For example, the mobile platform may be pointed towards the sound source to identify the direction of the sound source. Additionally or alternatively, locations of sounds sources may be identified using the microphone array and displayed to the user. The user may then identify the direction of sound sources using, e.g., a touch screen display. When the mobile platform moves with respect to the sound source, the orientation sensors detect the movement. The direction that the beamforming is implemented can then be adjusted based on the measured movement of the mobile platform as detected by the orientation sensors. Accordingly, beamforming may be continuously implemented in a desired direction of a sound source despite movement of the mobile platform with respect to the sound source. Images or video from a camera may be likewise controlled based on the data from the orientation sensors.

DETAILED DESCRIPTION

Figure 1A:
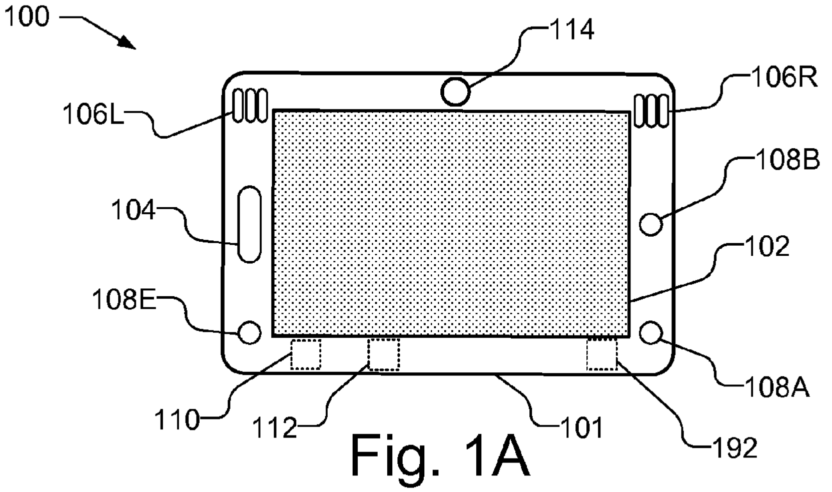
FIGS. 1A and 1B illustrate a front side and back side, respectively, of a mobile platform.
Figure 1B:
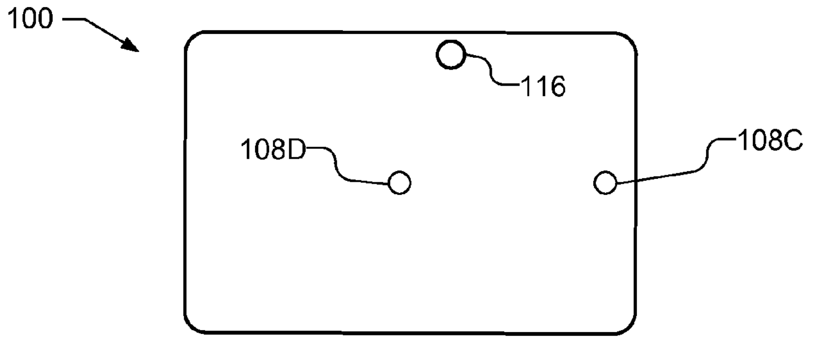

FIGS. 1A and 1B illustrate a front side and back side, respectively, of a mobile platform 100, which may be any portable electronic device such as a cellular phone, smart phone, computer tablet, or other wireless communication device, which may be capable of a telephony or video telephony. The mobile platform 100 includes a housing 101, a display 102, which may be a touch screen display, as well as an earpiece speaker 104 and two loud speakers 106L and 106R. Mobile platform 100 also includes an array of microphones 108A, 108B, 108C, 108D, and 108E (sometimes collectively referred to as microphone array 108) and a beamforming system, e.g., a microphone array controller 192, connected to the microphone array 108, which can implement beamforming to suppress or amplify sound from specific directions. Beamforming is described in U.S. Ser. No. 12/605,158 and U.S. Ser. No. 12/796,566, both of which are assigned to the assignee hereof and are hereby incorporated by reference in their entireties. The microphones may be, e.g., Piezo MicroElectrial-Mechanical System (MEMS) type microphones. The mobile platform 100 further includes orientation sensors 110, such as 3-axis accelerometer coupled with 3 axis-gyroscope and/or digital compass. Using the orientation sensors, the mobile platform 100 can steer a formed beam to amplify or suppress a sound source while the mobile platform 100 moves with respect to the sound source. A formed beam to suppress, i.e., reject, a sound source may sometimes be referred to as a null beam, while a beam to amplify a sound source may sometimes be referred to herein as simply a beam. Nevertheless, it should be understood that the terms "beam" and "beamforming" may be used to designate both amplification and suppression (i.e., "null beam" and "null beamforming") unless specifically indicated otherwise.

The mobile platform 100 may also include a wireless transceiver 112 and one or more cameras, such as a camera 114 on the front side of the mobile platform 100 and camera 116 on the back side of the mobile platform 100 (shown in FIG. 1B). It should be understood that the precise locations and number of individual elements may be varied if desired. For example, the microphone array 108 may include additional or fewer microphones, which may be positioned at different locations on the mobile platform 100, such as on the side of the housing 101.

As used herein, a mobile platform refers to any portable electronic device such as a cellular telephone, smart phone, tablet computer, or other wireless communication device, personal communication system (PCS) device, personal navigation device (PND), Personal Information Manager (PIM), Personal Digital Assistant (PDA), or other suitable mobile device. The mobile platform may be capable of transmitting and receiving wireless communications. The term mobile platform is also intended to include devices that communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile platform."

Moreover, the mobile platform 100 may access via transceiver 112 any wireless communication networks, such as cellular towers or from wireless communication access points, such as a wireless wide area network (WWAN), a wireless local area network (WLAN), a wireless personal area network (WPAN), and so on or any combination thereof. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network.

Figure 2A:
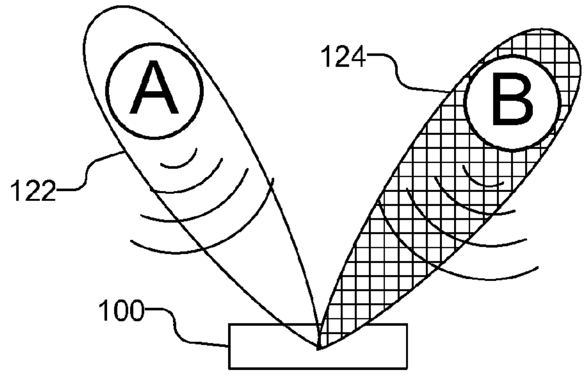
FIGS. 2A and 2B illustrate the mobile platform with different orientations with respect to two sound sources while continuously implementing beamforming with respect to both sound sources.
Figure 2B:
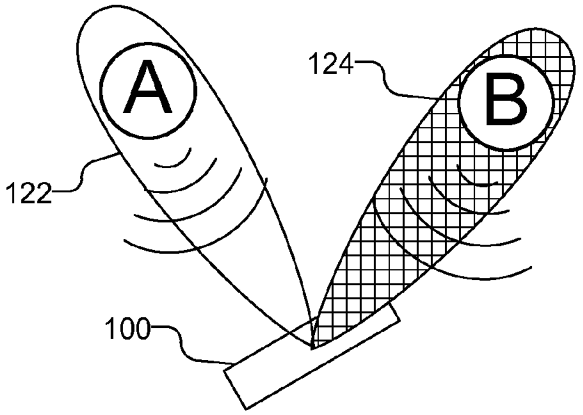
Figure 2C:
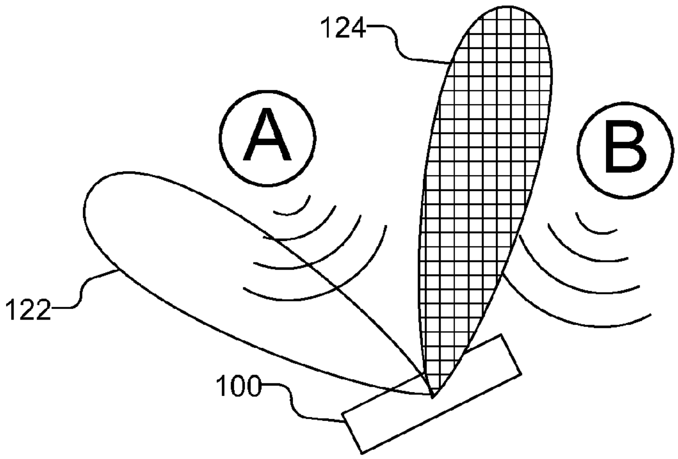
FIG. 2C illustrates the mobile platform performing beamforming without compensating for movement of the mobile platform with respect to sound sources.

With the use of the microphone array 108 and the orientation sensors 110, the mobile platform 100 is capable of implementing beamforming of one or more sound sources despite movement of the mobile platform 100 altering the orientation of the mobile platform with respect to the sound sources. As used herein, a sound source includes anything producing audio information, including people, animals, or objects. FIGS. 2A and 2B, by way of example, illustrate the mobile platform 100 with different orientations with respect to two sound sources, sound source A and sound source B, while continuously implementing beamforming with respect to both sound sources. Sound source A may be, e.g., a person, and is amplified by the microphone array 108 so that audio information from sound source A is included in a telephone or video telephony conversation via mobile platform 100, as illustrated by curve 122. Sound source B, on the other hand may be a noisy object to be suppressed by the microphone array 108 so that audio information from sound source B is excluded from or at least reduced in the telephone or video telephony conversation via mobile platform 100, as illustrated by hatched curve 124. As can be seen in FIG. 2B, despite a change in the orientation of the mobile platform 100 with respect to the sound sources A and B, the amplification of sound source A and suppression of sound source B is maintained, which is due to the use of data from the orientation sensors 110, shown in FIG. 1A. Thus, the mobile platform 100 steers a null of the beam towards the sound source B to be rejected (sometimes referred to as null beamforming) and steers the main lobe towards the desired sound source A (sometimes referred to simply as beamforming) By way of comparison, FIG. 2C illustrates the mobile platform 100 performing beamforming, but not compensating for movement of the mobile platform 100 with respect to the sound sources A and B. As can be seen in FIG. 2C, without adjusting for the rotation of the mobile platform 100, the mobile platform 100 will no longer implement beamforming in the direction of the sound sources A and B.

Figure 3:
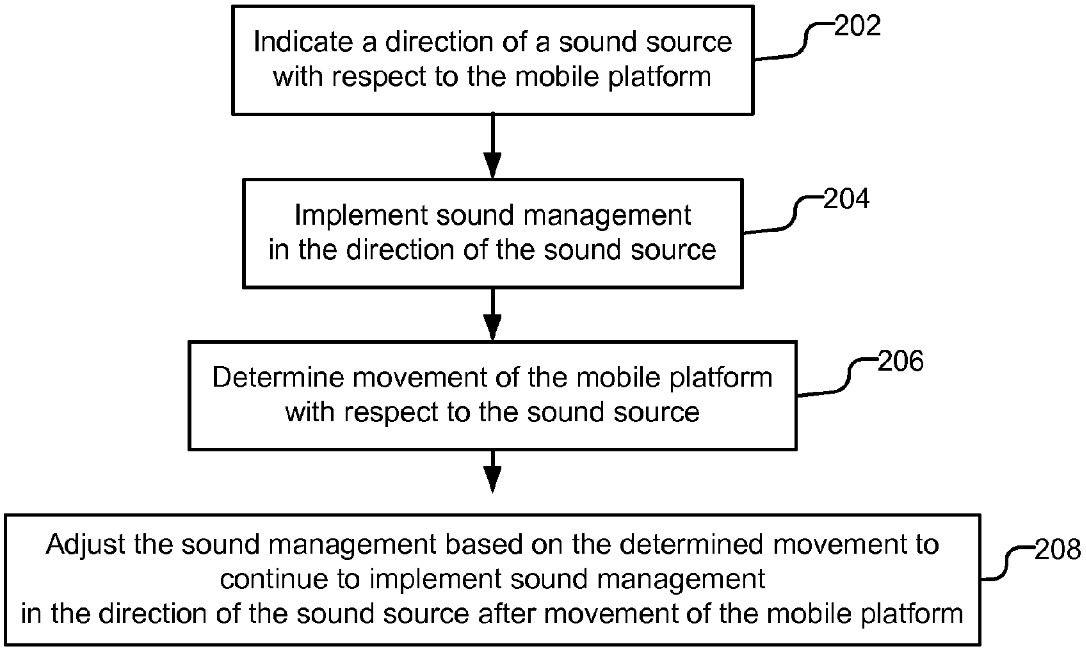
FIG. 3 illustrates a flow chart for implementing beamforming while the mobile platform moves with respect to the sound sources.

FIG. 3 illustrates a flow chart for continuously implementing beamforming in the direction of sound source while the mobile platform moves with respect to the sound source. As illustrated, a direction of the sound source with respect to the mobile platform is indicated (202), e.g., when the primary user wishes to include or at least partially exclude audio information from the sound source in a telephone or video telephony conversation. The indication of direction of the sound source may be performed, e.g., by pointing the mobile platform in the desired direction and pushing a button or by using a graphic user interface on the touch screen display other similar type of interface.

Figure 4A:
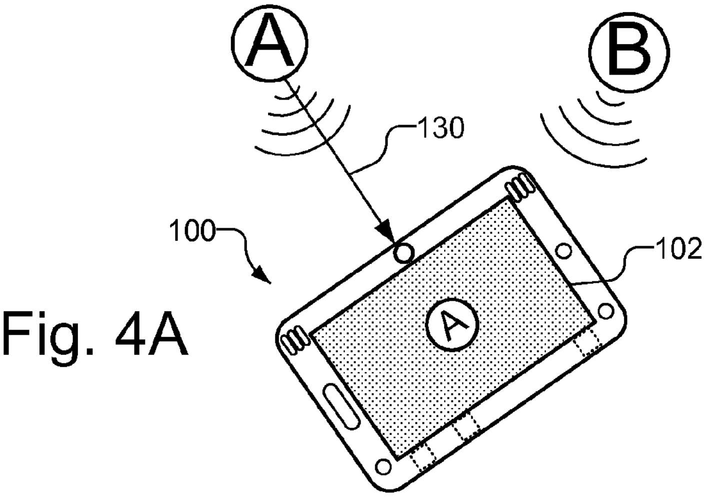
FIGS. 4A, 4B, and 4C illustrate indicating the direction of sound sources by pointing the mobile platform at the sound sources.
Figure 4B:
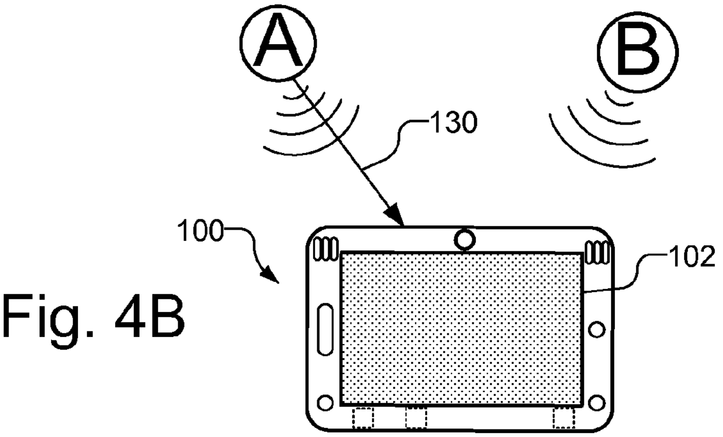
Figure 4C:
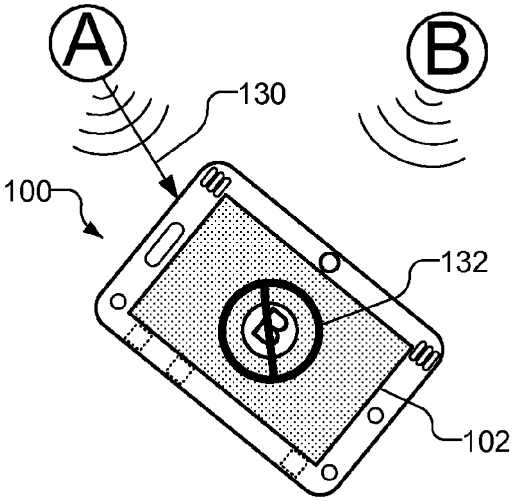

FIGS. 4A, 4B, and 4C illustrate indicating the direction of sound sources by pointing the mobile platform at the sound sources. FIG. 4A, by way of example, illustrates the mobile platform 100 pointed in the direction of sound source A, as indicated by the image of sound source A in the display 102. With the mobile platform A pointed towards the sound source A, the user may select the direction of sound source A for beamforming, e.g., by pushing a button or tapping the touch screen display 102 or through other appropriate user interface such as a gesture or quick movement of the mobile platform 100. As illustrated in FIG. 4A, sound source A is selected for amplification indicated by arrow 130, e.g., so that audio information from sound source A, along with the audio information from the primary user, may be included in a telephone or video telephony conversation. After indicating the direction of the sound source A, the mobile platform 100 may be moved or rotated to different position, as illustrated in FIG. 4B, which may be to place the mobile platform in a comfortable position for the primary user. As illustrated by arrow 130, the mobile platform 100 will continue to compensate for the movement of the mobile platform 100 so that audio information from sound source A will continue to be amplified by the beamforming system. Additionally, as illustrated in FIG. 4C, the mobile platform 100 may be moved to point in the direction of sound source B, as indicated by the image of the sound source B appearing in the display 102. Sound source B is selected for suppression in FIG. 4C (as indicated by the symbol 132), e.g., by pushing a different button, tapping the display 102 in a different manner, or through other appropriate user interface. The sound source B may be selected to be suppressed so that audio information from sound source B is at least partially reduced in the telephone or video telephone conversation.

Figure 5:
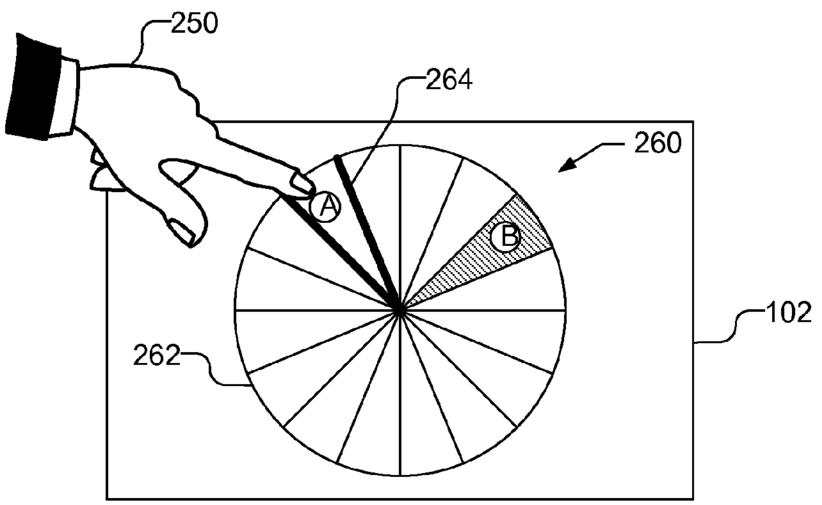
FIG. 5 illustrates indicating the direction of sound sources using a graphical user interface on the touch screen display.

FIG. 5 illustrates the hand of the primary user 250 indicating the direction of the sound source A with respect to the mobile platform using a graphical user interface 260 on the touch screen display 102. The graphical user interface, for example, illustrates sound sources A and B on a “radar” map 262, which is centered on the mobile platform 100. The sound sources may be detected, e.g., by using the microphone array 108 to pick up sounds above a predetermined gain level and to determine the direction and distance to the sound sources, which can then be displayed on the map 262. Determining the direction and distance to sound sources is described, e.g., in U.S. Ser. No. 12/605,158 and U.S. Ser. No. 12/796,566, both of which are assigned to the assignee hereof and are hereby incorporated by reference in their entireties. The user 250 can select one or more sound sources for amplification, e.g., sound source A as indicated by the dark bars 264, and one or more sound sources for suppression, e.g., sound source B as indicated by the hatching. Of course, other types of graphics may be used for the graphic user interface 260.

Figure 6:
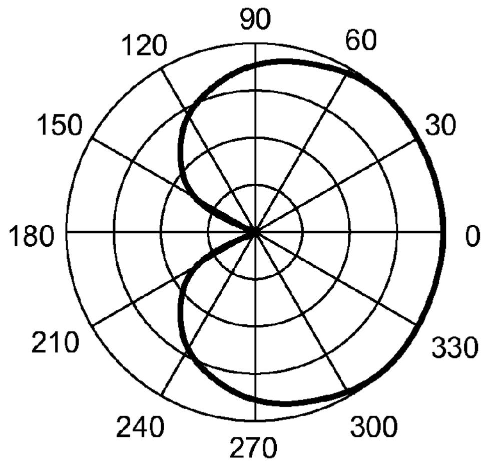
FIG. 6 illustrates the audio response versus the direction of a microphone array, such as that illustrated in FIG. 1.

Referring back to FIG. 3, beamforming is implemented in the direction of the sound source. (204). Beamforming is implemented by the microphone array controller 192 altering the delay and gain for each individual microphone in the microphone array 108, to amplifying sounds from certain desired directions and suppressing sound from other directions. Beamforming using a microphone array is discussed in U.S. Ser. No. 12/605,158 and U.S. Ser. No. 12/796,566, both of which are assigned to the assignee hereof and are hereby incorporated by reference in their entireties. In general, beamforming alters the delay and gain for each individual microphone in the microphone array 108 in order to produce a “null beam” in the direction of a sound source that is to be suppressed or to amplify a sound source from another direction. Microphone array 108 produces a multichannel signal in which each channel is based on the response of a corresponding one of the microphones to the acoustic environment. A phase-based or phase-correlation-based scheme may be used to identify time-frequency points that exhibit undesired phase difference characteristics (e.g., phase differences that are uncorrelated with frequency and/or that are correlated with frequency but indicate coherence in an undesired direction). Such identification may include performing a directional masking operation on the recorded multichannel signal. A directional masking operation may include, for example, applying a directional masking function (or “mask”) to results of a phase analysis of a multichannel signal in order to discard a large number of time-frequency points of the signal. FIG. 6, by way of example, illustrates an audio response versus direction of a microphone array, such as that illustrated in FIG. 1. As can be seen, the microphone array 108 can be targeted to pick up audio from a beam width of a desired angle in any desired direction.

In a conventional multiple microphone array based noise-suppression system, the algorithm attempts to identify the direction of the talker by processing a series of temporal-, spatial-, frequency- and amplitude-based acoustic information arriving at each one of the microphones. Microphones in tablet computers and netbooks are, in most use-cases, far enough away from the mouth speaker that the acoustic energy path-loss can be greater than 30 dB relative to the mouth reference point. This path-loss requires a high gain in the CODEC prior to digital conversion. Thus, conventional noise-suppression algorithms that maybe used for tablet computers and netbooks must overcome the fact that the background noise is also being amplified by the same gain factor as the desired speech. Consequently, a conventional noise-cancellation algorithm computes a direction for the desired speaker and steer a narrow beam towards that speaker. The beam width is a function of the frequency and microphone array 108 configuration, where narrower beamwidths come with stronger side lobes. A databank of beams of varying widths may be designed and stored in the mobile platform 100 and selected automatically or through the user interface so that the beam is of an appropriate width to include or exclude sound sources.

Using the orientation sensors 110, such as the compass, gyroscope, or a reference-angle-of-arrival generated from a stationary noise-source, movement of the mobile platform 100 is determined (206). In general, it may be presumed that the mobile platform 100 is moved with respect to the sound sources. Determining movement, including the change in orientation or position, using orientation sensors or a stationary noise-source is well known in the art.

The beamforming is adjusted based on the determined movement to continue to implement beamforming in the direction of the sound source after the mobile platform has moved (208). Thus, for example, as illustrated in FIGS. 4A and 4B, after indicating the direction of the sound source A, e.g., by pointing the mobile platform 100 in the direction of the sound source A and pushing a button or other appropriate selection mechanism, beamforming in the direction of sound source A is implemented, as illustrated by arrow 130. The user can then alter the orientation of the mobile platform 100 with respect to the sound source A, e.g., to place the mobile platform in a comfortable position (as illustrated in FIG. 4B). The orientation sensors 110 detect the movement of the mobile platform 100. For example, the orientation sensors 110 may determine that the mobile platform 100 has rotated by 50 degrees. The beamforming is then adjusted using the measured movement, e.g., by controlling the microphone array 108 to alter the direction of beamforming, in this case by −50 degrees, in order to continue to pick up audio information from sound source A. The microphone array 108 may be similarly controlled to continue to suppress audio information from sound source B by adjusting the direction of the beamforming based on the measurement movement of the mobile platform 100. In other words, the directional masking operation is adjusted based on the measured movement of the mobile platform so that the beamforming may continue to be implemented in the current direction of the sound sources. Consequently, a user is able to include multiple people (or other sound sources) that may be in different locations, and suppress undesired sound sources in a telephone or video-telephone conversation with a moving mobile platform.

Additionally, during a video-telephony conversation, it may be desirable for an image of a desired sound source, along with the user, to be displayed and transmitted. While the mobile platform 100 may be relatively stationary with respect to a user who is holding the mobile platform 100, the user's movement may cause the mobile platform 100 to move relative to other sound sources. Thus, images of the other sound sources may be shaky or, with sufficient user movement, the camera may pan away from the other sound sources. Accordingly, camera 116 may be controlled to compensate for movement of the mobile platform 100 using the measured motion from, e.g., the orientation sensors 110, by controlling the camera 116 to capture video or images from the indicated direction of a sound source and to use the determined movement to adjust the control of the camera to continue to capture images or video in the direction of the sound source after the mobile platform has moved.

Figure 7:
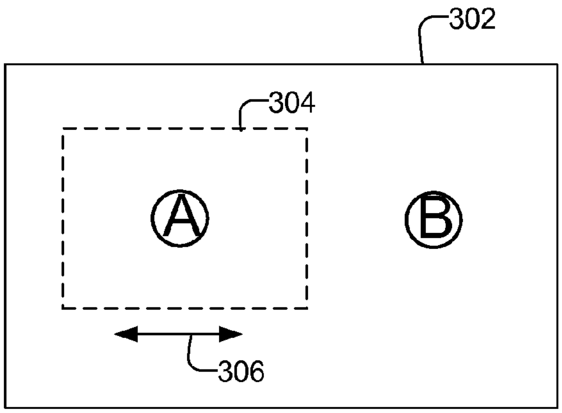
FIG. 7 illustrates controlling a camera in response to movement of the mobile platform with respect to a sound source.

The camera 116 can be controlled, e.g., by adjusting the PTZ (pan tilt zoom) of the camera 116 to point in the adjusted direction to continue capture video or images of the sound source after movement of the mobile platform. FIG. 7, by way of example, illustrates the total field of view 302 of camera 116, which includes sound sources A and B. However, only a cropped portion 304 of the total field of view 302 is displayed by the mobile platform 100, as illustrated by dotted lines. In other words, the total field of view 302 is cropped so that during the video-telephony conversation sound source A may be displayed in the cropped portion 304. As the mobile platform 100 is moved, as detected by the orientation sensors 110, the cropped portion 304 is moved within the total field of view 302, as illustrated by arrow 306, to compensate for the movement. Thus, for example, if the mobile platform 100 is rotated 2 degrees to the right, the cropped portion 304 is shifted 2 degrees to the left so that the sound source A remains in the image. Of course, the shift of the cropped portion 304 may be vertical as well as horizontal.

Additionally, the microphone array 108 may be used to pick up audio information from a specified direction that is used for applications other than telephone or video-telephony type applications. For example, the audio information may simply be recorded and stored. Alternatively, the audio information or may be translated in real-time or near real-time, e.g., either by the mobile platform 100 itself or by transmitting the audio information to a separate device, such as a server, via transceiver 112, where the audio information is translated and transmitted back to the mobile platform 100 and received by transceiver 112, such as Jibbigo by Mobile Technologies, LLC.

Figure 8:
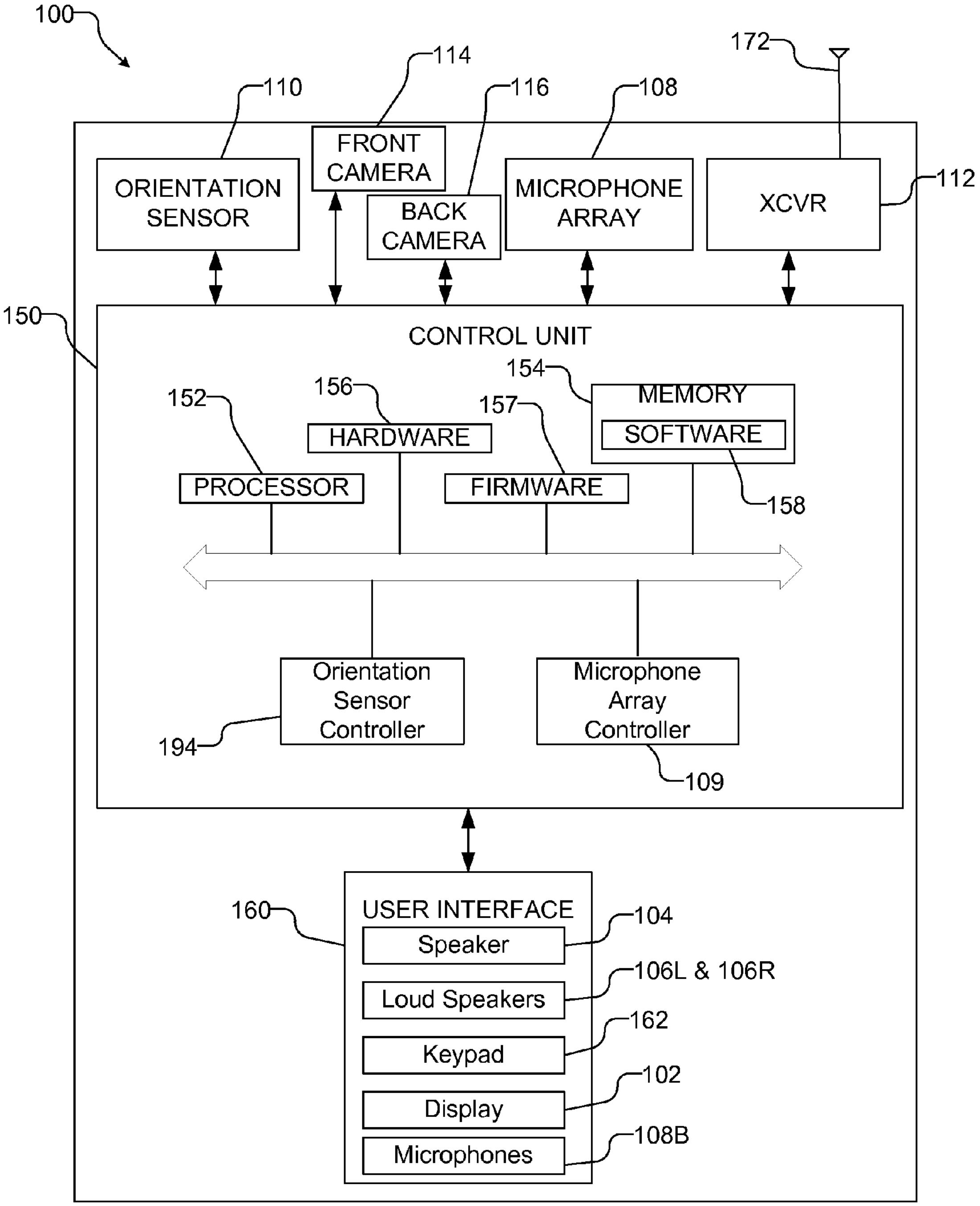
FIG. 8 is a block diagram of a mobile platform capable of adjusting the direction in which beamforming is performed based on data from orientation sensors.

FIG. 8 is a block diagram of a mobile platform 100 capable of for continuously implementing beamforming in the direction of sound source while the mobile platform moves based on data from orientation sensors. The mobile platform 100 includes a means for producing a multichannel signal in response to received acoustic signals, such as the microphone array 108, which may include a plurality of Piezo MicroElectrial-Mechanical System (MEMS) type microphones. The mobile platform 100 further includes a means for determining movement of the mobile platform, such as orientation sensors 110, which may be a three-axis accelerometer, which may be coupled with three axis gyroscope and/or a digital compass. Alternatively or additionally, the mobile platform 100 may determine movement using a reference-angle-of-arrival generated from a stationary noise-source. The mobile platform 100 may further include a wireless transceiver 112, e.g. a cellular modem or a wireless network radio receiver/transmitter that is capable of sending and receiving communications to and from a cellular tower or from a wireless access point, respectively, via antenna 172. The mobile platform may also include one or more cameras 114, 116.

The mobile platform 100 further includes a user interface 160 that may include, e.g., a speaker 104, and loud speakers 106L and 106R, as well as a display 102, which may be, e.g., an LCD (liquid crystal display) technology, or LPD (light emitting polymer display) technology, and may include a means for detecting a touch of the display, such as the capacitive or resistive touch sensors. The user interface 160 may further include a keypad 162 or other input device through which the user can input information into the mobile platform 100. If desired, the keypad 162 may be obviated by integrating a virtual keypad into the display 102 with a touch sensor. The user interface 160 also includes one or more of the microphones in the microphone array 108, such as microphone 108B shown in FIG. 1. Additionally, the orientation sensors 110 may be used as part of the user interface 160 by detecting gestures in the form of movement of the mobile platform 100. The mobile platform 100 includes a means for indicating a direction of a sound source with respect to a mobile platform, which may be, e.g., the orientation sensors when the user points the mobile platform 100 towards the sound source or a graphical user interface on the touch screen display 102.

The mobile platform 100 includes a control unit 150 that is connected to accept and process data from the orientation sensors 110, microphone array 108, transceiver 112, cameras 114, 116 and the user interface 160. The control unit 150 also controls the operation of the devices, including the microphone array 108, and thus, serves as a means for implementing beamforming and using movement detected by the orientation sensors to adjust the beamforming to continue to implement beamforming in the direction of the sound source after the mobile platform has moved with respect to the sound source. The control unit 150 may be provided by a processor 152 and associated memory 154, hardware 156, software 158, and firmware 157. The control unit 150 includes a means for implementing beamforming, which is illustrated as a microphone array controller 192, and a means for measuring movement of the mobile platform, illustrated as the orientation sensor controller 194. Where the movement is determined based on a reference-angle-of-arrival generated from a stationary noise-source, the microphone array controller 192 may be used to determine movement. The microphone array controller 192 and orientation sensor controller 194 may be implanted in the processor 152, hardware 156, firmware 157, or software 158, i.e., computer readable media stored in memory 154 and executed by processor 152, or a combination thereof, but are illustrated separately for clarity.

It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 158 may include program codes stored in memory 154 and executed by the processor 152 and may be used to run the processor and to control the operation of the mobile platform 100 as described herein. A program code stored in a computer-readable medium, such as memory 154, may include program code program code program code to identify a direction of a sound source based on a user input; program code to implement beamforming to amplify or suppress audio information received by a microphone array in the direction of the sound source; program code to determine movement of the microphone array; and program code to use the determined movement to adjust the beamforming to continue to implement beamforming in the direction of the sound source after the microphone array has moved with respect to the sound source. The program code stored in a computer-readable medium may additionally include program code to cause the processor to control any operation of the mobile platform 100 as described herein.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media and does not refer to transitory propagating signals. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:

pointing a mobile platform towards a sound source to select a direction of the sound source with respect to the mobile platform for amplification or suppression of audio information;

implementing beamforming with the mobile platform in the direction of the sound source to amplify or suppress audio information from the sound source;

determining movement of the mobile platform with respect to the sound source; and using the determined movement to adjust the beamforming to continue to implement beamforming in the direction of the sound source after the mobile platform has moved with respect to the sound source.

2. The method of claim 1, wherein the sound source is a first sound source in a first direction, the method further comprising:

indicating a second direction of a second sound source with respect to the mobile platform;

implementing beamforming with the mobile platform in the second direction of the second sound source to amplify or suppress audio information from the sound source; and using the determined movement to adjust the beamforming to continue to implement beamforming in the first direction of the first sound source and in the second direction of the second sound source after the mobile platform has moved.

3. The method of claim 2, wherein indicating the second direction of the second sound source with respect to the mobile platform comprises:

pointing the mobile platform towards the second sound source to select the second direction of the second sound source with respect to the mobile platform for amplification or suppression of audio information.

4. The method of claim 2, wherein indicating the second direction of the second sound source is performed after implementing beamforming in the first direction of the first sound source.

5. The method of claim 1, wherein the direction of the sound source with respect to the mobile platform for amplification or suppression of audio information is further selected using movement of the mobile platform.

6. The method of claim 1, wherein the direction of the sound source with respect to the mobile platform for amplification or suppression of audio information is further selected using a display on the mobile platform.

7. The method of claim 1, wherein implementing beamforming comprises processing a multichannel signal from a microphone array on the mobile platform.

8. The method of claim 1, further comprising wirelessly transmitting audio information from the direction of the sound source after implementing beamforming.

9. The method of claim 8, wherein the audio information is wirelessly transmitted in a telephone call.

10. The method of claim 1, further comprising obtaining a translation of audio information from the direction of the sound source after implementing beamforming.

11. The method of claim 1, further comprising:

controlling a camera on the mobile platform to capture at least one of video and images from the direction of the sound source; and using the determined movement to adjust control of the camera to continue to capture at least one of video and images from the direction of the sound source after the mobile platform has moved with respect to the sound source.

12. A mobile platform comprising:

a microphone array;

orientation sensors;

a processor connected to the microphone array and the orientation sensors;

the processor configured to select a direction of a sound source for amplification or suppression of audio information based on the mobile platform being pointed in the direction of the sound source, to implement beamforming to amplify or suppress audio information received by the microphone array in the direction of the sound source, to determine movement of the mobile platform using data provided by the orientation sensors, and to use the determined movement to adjust the beamforming to continue to implement beamforming in the direction of the sound source after the mobile platform has moved with respect to the sound source.

13. The mobile platform of claim 12, wherein the sound source is a first sound source in a first direction and wherein the processor is further configured to select a second direction of a second sound source based on user input, to implement beamforming to amplify or suppress audio information received by the microphone array in the second direction of the second sound source, and to use the determined movement to adjust the beamforming to continue to implement beamforming in the first direction of the first sound source and in the second direction of the second sound source after the mobile platform has moved.

14. The mobile platform of claim 12, wherein the processor is further configured to select the direction of the sound source for amplification or suppression of audio information based on movement of the mobile platform.

15. The mobile platform of claim 12, further comprising a touch screen display coupled to the processor, wherein the processor is further configured to select the direction of the sound source for amplification or suppression of audio information is further selected based on data provided by the touch screen display.

16. The mobile platform of claim 12, wherein the processor is further configured to implement beamforming by processing a multichannel signal from the microphone array.

17. The mobile platform of claim 12, further comprising a wireless transceiver coupled to the processor, wherein the processor is further configured to control the wireless transceiver to transmit audio information obtained from the direction of the sound source after beamforming is implemented.

18. The mobile platform of claim 17, wherein the audio information is transmitted in a telephone call.

19. The mobile platform of claim 17, wherein in response to the transmitted audio information, the wireless transceiver receives a translation of the audio information.

20. The mobile platform of claim 12, further comprising a camera coupled to the processor, wherein the processor is further configured to capture at least one of video and images from the direction of the sound source, and to adjust the control of the camera to continue to capture at least one of video and images from the direction of the sound source after the mobile platform has moved with respect to the sound source.

21. A system comprising:

means for selecting a direction of a sound source with respect to a mobile platform for amplification or suppression of audio information based on the mobile platform being pointed in the direction of the sound source;

means for implementing beamforming with the mobile platform in the direction of the sound source to amplify or suppress audio information from the sound source;

means for determining movement of the mobile platform with respect to the sound source; and means for using the determined movement to adjust the beamforming to continue to implement beamforming in the direction of the sound source after the mobile platform has moved with respect to the sound source.

22. A computer-readable medium including program code stored thereon, comprising:

program code to select a direction of a sound source for amplification or suppression of audio information based on a microphone array being pointed in the direction of the sound source;

program code to implement beamforming to amplify or suppress audio information received by the microphone array in the direction of the sound source;

program code to determine movement of the microphone array; and program code to use the determined movement to adjust the beamforming to continue to implement beamforming in the direction of the sound source after the microphone array has moved with respect to the sound source.

* * * * *